United States Patent [19]

Chern

[11] Patent Number: 4,801,959
[45] Date of Patent: Jan. 31, 1989

[54] CORDLESS REMOTE CONTROL SHUTTER ACTIVATION DEVICE

[76] Inventor: Ming J. Chern, No.-1, Alley 2, Lane 290, Hsien Cheng Road, Ling Ya District, Kaohsiung City, Taiwan

[21] Appl. No.: 122,860

[22] Filed: Nov. 17, 1987

[51] Int. Cl.⁴ .................................... G03D 17/38
[52] U.S. Cl. .................................. 354/266; 354/295
[58] Field of Search ............................. 354/266, 295

[56] References Cited

U.S. PATENT DOCUMENTS 4,383,744  5/1983  O'Connell .................. 354/266 X
4,707,127  11/1987  Goedken ..................... 354/266

Primary Examiner—Michael L. Gellner
Attorney, Agent, or Firm—Bacon & Thomas

[57] ABSTRACT

A device which clamps onto one side of a camera which is cordlessly remotely operated so as to mechanically push down the shutter release button on the camera. The device comprises an inverted L shaped housing with a threaded shaft running therethrough for positioning a gripping portion and a base to support the camera. The device is battery operated to drive a motor and a series of reducing gears, which in turn drive a driving arm downwards or upwards to activate the shutter release button.

1 Claim, 5 Drawing Sheets

CORDLESS REMOTE CONTROL SHUTTER ACTIVATION DEVICE

BACKGROUND OF THE INVENTION

This invention relates to a remote control device for activating the shutter of a camera and in particular relates to a such a device which is cordless and which mechanically presses the shutter button.

In the past, devices for activating the shutter of a camera have been available, but each of the conventional types now available has its own drawbacks. One conventional type of shutter activation is the drawcord, which is primarily used for night photography. Using a drawcord, the shutter can be held open as long as is desired by the photographer so as to allow for a better exposure. However, if the photographer doesn't continue to pull the cord, the shutter will of course close the aperture of the camera, which can be bothersome. Also, cords can in some situations be inconvenient to use, especially if the photographer is photographing himself. A second type of conventional automatic shutter device utilizes a timer in conjunction with an electric circuit. In this second type of conventional shutter operation device, a button or lever must be pushed by the photographer, then allowing him a set period of time to set himself in the field of vision of the camera for the picture. Obviously, the photographer might have trouble getting ready for the picture in time or might not be ready when the picture is taken because he doesn't know exactly when the picture is going to be taken.

It is the purpose of this present invention, therefore, to mitigate and/or obviate the abovementioned drawbacks in the manner set forth in the detailed description of the preferred embodiment.

SUMMARY OF THE INVENTION

A primary objective of this invention is to provide a remote controlled, cordless shutter button activation device for cameras.

Another objective of this invention is to provide such a shutter button activation device which mechanically operates the shutter release button of a camera.

A further objective of this invention is to provide a shutter button activation device which can be used on a wide range of cameras without any modification of the camera.

Further objectives and advantages of the present invention will become apparent as the following description proceeds, and the features of novelty which characterize the invention are pointed out with particularity in the claims annexed to and forming a part of this invention.

BRIEF DESCRIPTION OF THE DRAWINGS

FIG. 2-B is a cutaway view of a shutter button operation device, taken along line 2B—2B of FIG. 3;

DETAILED DESCRIPTION OF THE PREFERRED EMBODIMENT

Figure 1:
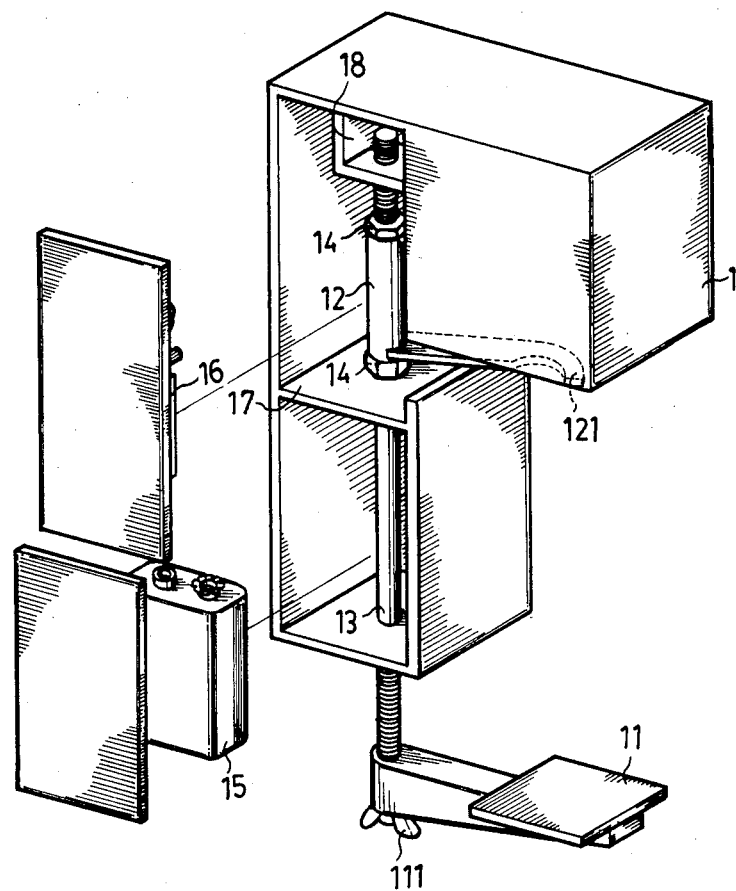
FIG. 1 is a perspective view of a shutter button activation device in accordance with the present invention.

Referring to FIG. 1, it can be seen that the present invention comprises a housing 1, a threaded shaft 13, a base 11, and a wing nut 111. The housing 1 substantially has the shape of an inverted or upside down "L", including a long leg and a short leg. The long leg houses a threaded shaft 13. The threaded shaft 13 threads through the end block 18, a partition plate 17 and protrudes from the bottom wall of the housing 1. A securement arm 12, including a cylindrical turning portion and a gripping portion 121, can be seen to be rotatably fixed on an upper part of about the threaded shaft 13.

Figure 2B:
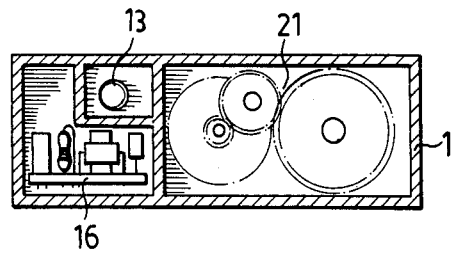
FIG. 2-A is an elevational cross-sectional view of the inside of a shutter button operation device in accordance present invention.
Figure 2A:
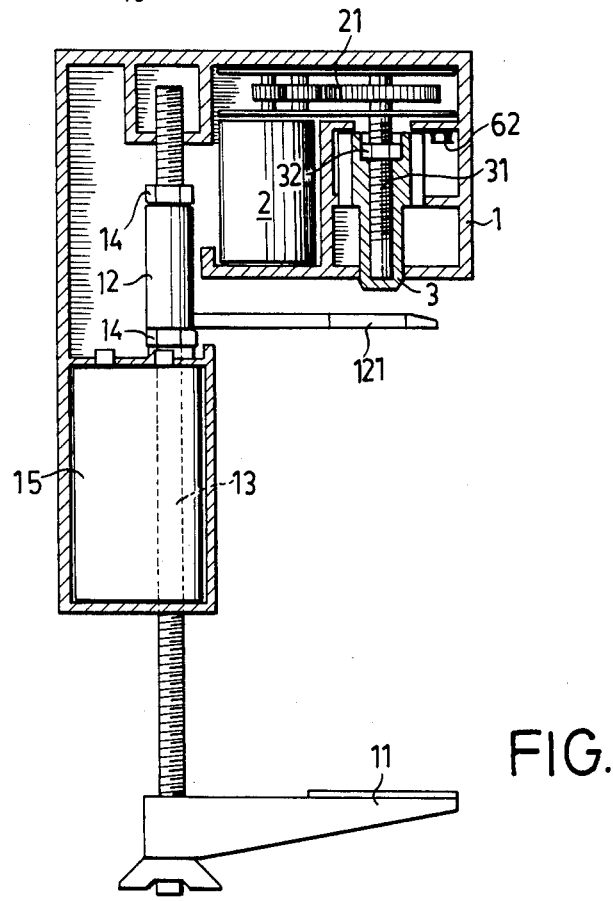

Referring now to FIG. 2-A, it can be seen more clearly that the cylindrical turning portion is mounted on the threaded shaft 13 between two securement nuts 14, which secure the cylindrical turning portion so that it can rotate about the threaded shaft 13. A base 11 is threadably supported on the lower end of the threaded shaft 13 for supporting one end of a camera. The base 11 works in conjunction with the gripping portion 121 to form a clamp like device. There is a wing nut below the base for urging the base 11 upwards so as to clamp one end of the camera between the base 11 and the gripping portion 121.

The short leg (upper leg) houses a driving apparatus including a battery driven motor 2, a set of reducing gears 21, and a driving arm 3 with a positioning nut 32 being fixed in a recess therein. The reducing gears 21 drive a threaded driving shaft 31, which in turn threads the positioning nut 32 upwards or downwards along the driving shaft 31. As the positioning nut 32 is driven upwards or downwards, the driving arm is correspondingly driven upwards or downwards, since the positioning nut is fixably secured in a recess in the top of said driving arm 3.

Figure 3:
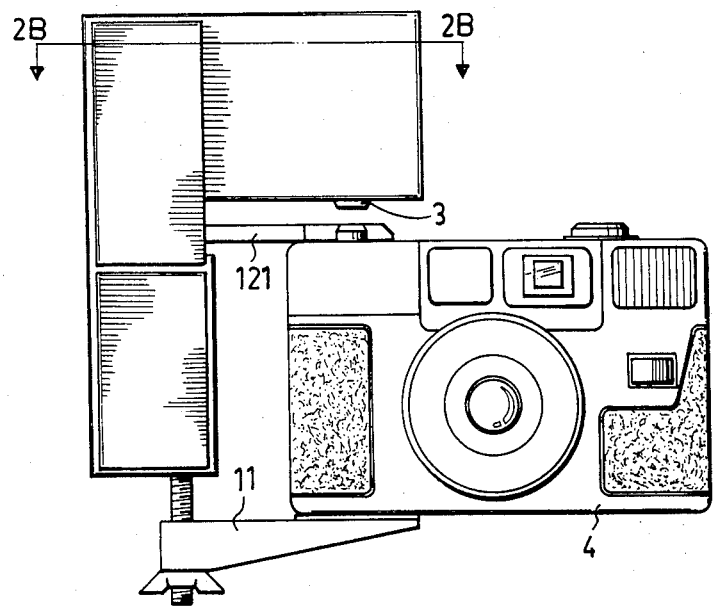
FIG. 3 is a front elevational working view of a shutter operation device in accordance with the present invention.

Referring further to FIG. 3, it can be seen that as the driving arm is urged downwards the shutter release button of the camera will be pressed down. Once the shutter release button is pressed as far as it can go, the circuit of the driving apparatus changes the direction of the motor 2 (the operation of the circuit will be discussed in more detail hereinbelow) so as to drive the driving arm upwards.

Figure 4:
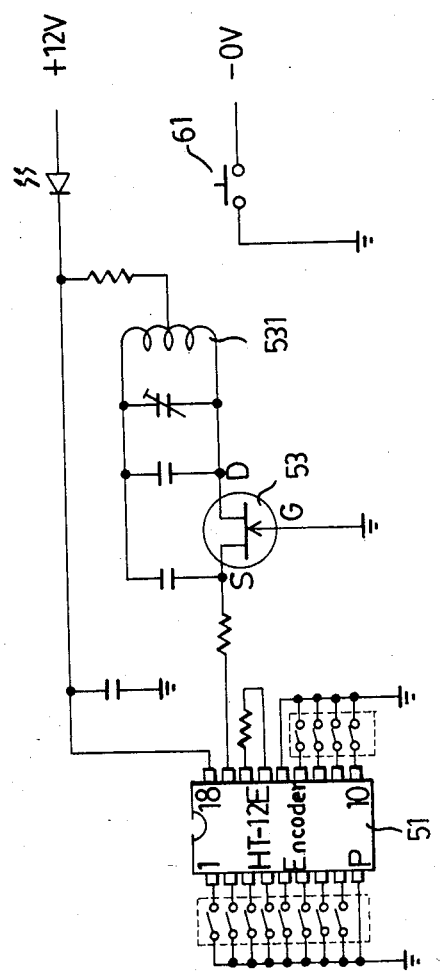
FIG. 4 is a circuit diagram of the transmitter of a remote control device in accordance with the present invention.
Figure 5:
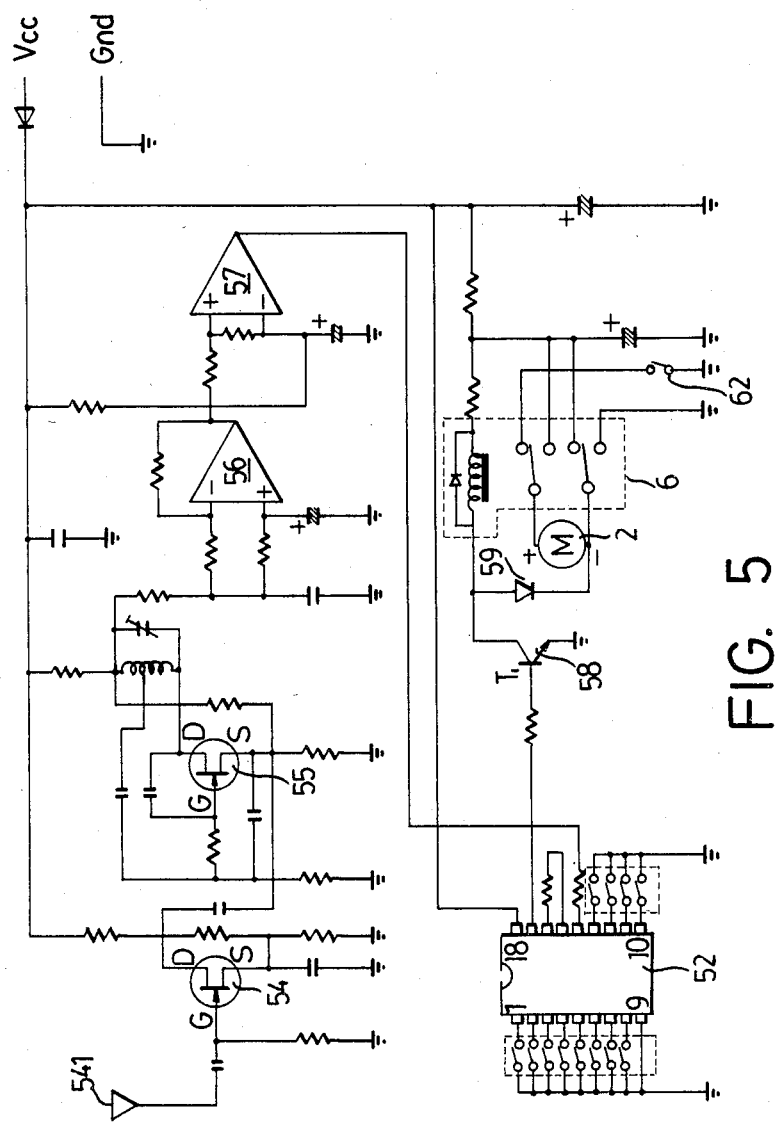
FIG. 5 is a circuit diagram of a drive apparatus in accordance with the present invention.

Now referring to FIG. 4 and 5, the circuitry of the present invention will be discussed. FIG. 4 shows the circuitry of a remote control transmitter (not shown in the other figures) which emits a signal which is received by the antenna 541. The circuit board 16 receives the signal from the remote control transmitter by means of an antenna 541, as shown in FIG. 5, so that the signal is sent through a series of FET's 54, 55 and OP AMP's 56, 57 and finally to a decoder 52. The antenna (541) is fixably connected to the circuit board (16) which in turn is fixed to the back surface of the upper cover of said housing (1). The decoder 52 compares the value of the input signal with a preset value. If the values agree, then an output signal is sent through a transistor 58 and a relay 6, which influences the direction of rotation (CW or CCW) of the motor 2.

When the user activates the remote control device (not shown in figures), the circuit of circuit board 16 activates the motor 2 to turn CCW which in turn will turn the driving shaft 31 CCW. As the driving shaft turns CCW, the positioning nut 32 is threaded downwards, thereby urging the driving arm 3 downwards. As the driving arm 3 presses the shutter release button of the camera as far as it will go, then it becomes more and more difficult for the motor to continue turning the driving shaft 31, which in turn causes the flow of current in the motor 2 to increase. As the flow of current increases, the flow of current through the relay decreases, causing the relay 6 to switch so as to change the direction of the driving shaft 31 from CCW to CW. Accordingly, the driving arm 3 reverses in direction until it activates a microswitch 62, the latter being fixed on an inside portion of the short leg of the housing (1), thereby cutting off the motor 2 and completing the overall cycle.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A remote controlled cordless shutter release activation device comprising:

(a) an inverted L-shaped housing (1), said housing (1) including a long leg which houses a threaded shaft (13) and a short leg; said threaded shaft (13) protruding from a bottom wall of said housing (1) so as to threadably support a base (11) on a lower end thereof; a securement arm (12) with a gripping portion (121) thereon, said securement arm (12) being rotatably fixed on an upper part of said threaded shaft (13) by securement nuts (14); said base (11) acting in conjunction with said gripping portion (121) of said securement arm (12) to clamp one end of a camera therebetween;

(b) an antenna (541) and a driving apparatus circuit board (16) and a microswitch (62) for controlling a driving apparatus; said antenna (541) receiving a signal from a remote control signal transmission device operated by a user; said circuit board (16) including two FET's (54, 55), two OP AMP's (56, 57), a decoder (52), a transistor (58), and a relay (6) said antenna (541) being fixably connected to the circuit board (16) and disposed within said housing (1); said microswitch (62) being fixed on an inside portion of the short leg of said housing (1); and (c) said driving apparatus being housed in said short leg of said housing (1) and including: a battery driven motor (2), a set of reducing gears (21), a driving shaft (31), a positioning nut (32) and a driving arm (3); said motor (2) driving a set of reducing gears (21); said reducing gears (21) driving a driving shaft (31), said driving shaft (31) threadably displacing a positioning nut (32) upwards or downwards with respect to direction of rotation of said motor (2); said positioning nut (32) being fixed in a recess in a driving arm (3) so that said driving arm (3) is displaced together with said positioning nut (32) to press down and release a shutter release button on said camera.

* * * * *